(12) United States Patent
Blacklaw

(10) Patent No.: US 7,322,421 B2
(45) Date of Patent: Jan. 29, 2008

(54) FIBER OPTIC DEPLOYMENT APPARATUS AND METHOD

(75) Inventor: David William Blacklaw, Katy, TX (US)

(73) Assignee: Welldynamics Inc., Spring, TX (US)

( * ) Notice: Subject to any disclaimer, the term of this patent is extended or adjusted under 35 U.S.C. 154(b) by 212 days.

(21) Appl. No.: 10/987,143

(22) Filed: Nov. 12, 2004

(65) Prior Publication Data

US 2005/0109518 A1    May 26, 2005

(51) Int. Cl.
    *E21B 19/22* (2006.01)
(52) U.S. Cl. .................. 166/383; 166/385; 166/77.1
(58) Field of Classification Search ................ 166/380, 166/384, 385, 77.2, 70, 153, 242.2; 254/134.4, 254/900, 93 R; 405/184
    See application file for complete search history.

(56) References Cited

U.S. PATENT DOCUMENTS

| | | | | |
|---|---|---|---|---|
| 3,119,600 A | * | 1/1964 | Bitter | 254/134.4 |
| 3,301,531 A | * | 1/1967 | Corsiglia | 254/134.4 |
| 3,467,196 A | * | 9/1969 | Kinsman | 166/383 |
| 4,048,807 A | | 9/1977 | Ellers | |
| 4,185,809 A | * | 1/1980 | Jonnes | 254/134.4 |
| 4,337,923 A | * | 7/1982 | Smith | 254/134.3 FT |
| 4,460,159 A | * | 7/1984 | Charlebois et al. | 254/134.3 R |
| 4,485,870 A | * | 12/1984 | Walulik | 166/250.17 |
| 4,648,744 A | * | 3/1987 | Knapp | 405/183.5 |
| 4,715,747 A | * | 12/1987 | Behrens | 405/303 |
| 4,783,054 A | * | 11/1988 | Morel et al. | 254/134.4 |
| 4,848,734 A | * | 7/1989 | Ford | 254/134.4 |
| 5,156,376 A | * | 10/1992 | Spicer | 254/134.4 |
| 5,762,321 A | * | 6/1998 | Petersen et al. | 254/134.4 |
| 5,813,658 A | * | 9/1998 | Kaminski et al. | 254/134.4 |
| 5,892,860 A | * | 4/1999 | Maron et al. | 385/12 |
| 5,992,250 A | * | 11/1999 | Kluth et al. | 73/866.5 |
| 6,059,264 A | | 5/2000 | Kaminski | |
| 6,109,595 A | | 8/2000 | Lecours | |

(Continued)

FOREIGN PATENT DOCUMENTS

| | | |
|---|---|---|
| GB | 2151414 A | 7/1985 |
| GB | 2171218 A | 8/1986 |
| GB | 2312995 A | 11/1997 |

OTHER PUBLICATIONS

"Downhole monitoring—Listening with light" published Apr. 2003 Offshore Engineer magazine on p. 26-30.

(Continued)

*Primary Examiner*—Frank Tsay
(74) *Attorney, Agent, or Firm*—Smith IP Services, P.C.

(57) ABSTRACT

A head member having a piston provided thereon is connected to an elongate tube such as a micro-tube. The micro-tube contains one or more optical fibres, preferably suspended therein by a protective fluid such as a scavenging gel. The head member is preferably inserted into an already-deployed downhole tubular and fluid is pumped down that already deployed tubular behind the piston such that the head member and attached micro-tube and optical fiber(s) are pumped downhole. A sealing means such as a resin material may be pumped downhole in the annulus between the outer circumference of the micro-tube and the inner circumference of the already-deployed tubular downhole in low viscosity form and which may be adapted to cure or harden after a passage of time and/or under application of heat.

17 Claims, 3 Drawing Sheets

U.S. PATENT DOCUMENTS

| | | | |
|---|---|---|---|
| 6,129,341 | A | 10/2000 | Griffioen |
| RE37,283 | E | 7/2001 | Kluth et al. |
| 6,268,911 | B1 | 7/2001 | Tubel et al. |
| 6,532,839 | B1 | 3/2003 | Kluth et al. |
| 6,557,630 | B2 | 5/2003 | Harkins et al. |
| 6,614,962 | B1 * | 9/2003 | Serrander et al. ............. 385/45 |
| 6,817,257 | B2 * | 11/2004 | Kluth et al. ............... 73/866.5 |
| 6,932,323 | B2 * | 8/2005 | James ..................... 254/134.4 |
| 2003/0020055 | A1 * | 1/2003 | Griffioen ................ 254/134.4 |
| 2003/0172752 | A1 * | 9/2003 | Kluth et al. ............... 73/866.5 |
| 2004/0007699 | A1 * | 1/2004 | Griffioen et al. ......... 254/134.4 |
| 2005/0017227 | A1 * | 1/2005 | James ..................... 254/134.4 |
| 2006/0054874 | A1 * | 3/2006 | Oberli et al. ............ 254/134.4 |

OTHER PUBLICATIONS

Downhole monitoring—Glamour models age reliably published in Sep. 2002 Offshore Engineer magazine on pp. 17-19; and.

Three pages discussing Fiber Bragg Gratings from an unknown book—publication date unknown, but was certainly before priority date.

Examination Report for UK application No. GB0424908.2, dated Feb. 21, 2006.

Examination Report for UK Application No. GB0424908.2, dated Jul. 3, 2006.

Search and Examination Report for UK application No. GB0621759.0.

* cited by examiner

FIBER OPTIC DEPLOYMENT APPARATUS AND METHOD

FIELD OF THE INVENTION

The present invention relates to an apparatus of, and method for, deploying an optical fiber, and more particularly but not exclusively, relates to an apparatus for, and method of, deploying an optical fiber into a downhole oil, gas or water borehole.

BACKGROUND OF THE INVENTION

Optical fibers have been increasingly used in recent years downhole in oil, gas or water re-injection wells as a conduit for retrieving data/signals from various sensors/tools and/or for sending data/signals to sensors/tools located within the well.

To date, an optical fiber can be deployed in an oil or gas or water injection well by a number of methods. Some of these conventional methods provide advantages such as lower cost of installation, low risk on installation, easier access to the zone of interest to be measured or better protection of the fiber against chemical attack or mechanical damage, but each of them have disadvantages which can mitigate the advantages they provide.

For example, Tubing Encased Fiber (TEF) Fixed Fiber Deployment has been used for a number of years by various organisations, and involves fixing an optical fiber inside a protective device which may be a tube, housing or solid encapsulation. The tube is then itself fixed to the outside of the production tubing, casing or other in-well tubulars, at the surface of the borehole. The TEF is then deployed or run into the borehole with the in-well tubulars.

Alternatively, the optical fiber is mounted in a micro-tube of a few mm or less diameter, which in turn is mounted inside an external package, which typically could be a ¼" or ⅜" diameter steel or alloy tube commonly used for various downhole applications. An encapsulation material is also commonly used to further protect this package during installation/running into the well. The optical fiber may be suitably protected by, for example, scavenger gel, or a fiber coating of metal or carbon, or other means in order to exclude hydrogen, water or other undesirable substances from the vicinity of the fiber.

Another alternative method of deploying an optical fiber downhole is to run in a suitable tube attached to the in-well tubular (such as production tubing), and to pump in the optical fiber into the suitable pre-deployed tube at a later date using a gas or a liquid to carry/transport the fiber through the tube; this method is referred to as Pumped Fiber Deployment. A number of existing patents cover various aspects of such pumped fiber deployment, such as U.S. Pat. No. 6,532,839, U.S. Pat. No. 6,557,630, U.S. Pat. No. Re 37,283, U.S. Pat. No. 6,268,911 and U.S. Pat. No. 5,892, 860.

Advantages, where feasible, to install the external mounting for the fiber in the well, and to insert the optical fiber later, include the ability to replace failed or poor fibers with new items. Such new items may be devices not available at the time of initial installation.

Disadvantages of such pumped fiber deployment (i.e. insertion of the fiber subsequent to initial installation) include the risk of damage to the fiber, and logistical difficulties, e.g. in the case of subsea wells.

Previously-used pumped fiber deployment methods include pumping the fiber in with water or some other liquid. A particular disadvantage of this technique is that exposure to water has been known to cause damage to the fiber over time. Specifically, such exposure to water can degrade the attenuation properties of the fiber to light passing through it. This effect is typically non-linear, which generates inaccuracies in some measured parameters. Increased attenuation, if severe enough, may cause loss of the signal to be measured.

SUMMARY OF THE INVENTION

According to a first aspect of the present invention there is provided an apparatus for deploying an optical fiber downhole, the apparatus comprising:
  a. a head member for attachment to an end of the optical fiber;
  b. wherein the head member comprises a piston member against which fluid pressure can act to provide a force to move the head member.

According to a first aspect of the present invention there is provided a method of deploying an optical fiber downhole, the method comprising:—
  a. attaching a head member to an end of the optical fiber;
  b. providing the head member with a piston member;
  c. wherein the piston member is arranged such that fluid pressure can act against the piston member to provide a force to move the head member.

Preferably, the head member is inserted into a conduit located downhole at the surface of a wellbore. Typically, fluid is then pumped into the throughbore of the conduit, and the piston member is preferably adapted to provide at least a partial obstruction to the throughbore of the conduit such that pressure can build up behind the piston member. Preferably, the optical fiber is payed out from a reel member into the downhole conduit, preferably through a seal member which may be a stuffing box, and typically, a pump mechanism is in fluid communication with the throughbore of the conduit. Preferably, actuation of the pump mechanism pumps the fluid, which is preferably hydraulic fluid such as silicon oil or the like, into the throughbore of the conduit, which may less preferably be through a port in a sidewall of the downhole conduit or more preferably through a sidewall of a different conduit such as a lead-in conduit in sealed fluid communication with the downhole conduit. Typically, the pump mechanism is only actuated once the head member is downstream of the said port in the sidewall.

Typically, the downhole conduit having the throughbore is installed downhole within the wellbore as a first step and preferably the optical fiber is deployed within the throughbore of the downhole conduit as a second, later, step.

Typically, the downhole conduit comprises a substantially cylindrical tube, and the head member typically comprises a substantially cylindrical body. Preferably, the head member comprises a drift head member having a tapered nose member and a drift tail portion, and the piston member is preferably mounted upon the head member and more preferably is mounted upon the drift tail portion. Typically, the piston member comprises one or more ring members; where more than one ring members are provided, they are preferably spaced apart along a longitudinal axis of the piston head member. The more than one ring members are preferably spaced apart by spacing members. Preferably, the ring members are formed from a low friction material and are preferably formed from PTFE.

Typically, the optical fibers are located within, and are preferably sealed and encased within, an elongate member, and may be supported by a fluid such as a gel material within the elongate member. One or more optical fibers may be located within the elongate member, and it is preferably one end of the elongate member that is attached to the head member.

The elongate member may have a low friction material forming or coating applied to its outer surface, and said low friction material may be PTFE.

According to a second aspect of the present invention there is provided an apparatus for deploying one or more optical fiber(s) downhole, the apparatus comprising:—
 a. an elongate tubular member having a throughbore which is adapted to envelop the one or more optical fiber(s).

According to a second aspect of the present invention there is provided a method of deploying one or more optical fiber(s) downhole, the method comprising the steps of:—
 a. locating said one or more optical fiber(s) within a throughbore of an elongate tubular member; and
 b. deploying said elongate tubular member downhole.

Typically, the downhole conduit comprises a substantially cylindrical tube, and the head member typically comprises a substantially cylindrical body. Preferably, the head member comprises a drift head member having a tapered nose member and a drift neck portion, and the piston member is preferably mounted upon the head member and more preferably is mounted upon the drift neck portion. Typically, the piston member comprises one or more ring members; where more than one ring members are provided, they are preferably spaced apart along a longitudinal axis of the piston head member. The more than one ring members are preferably spaced apart by spacing members. Preferably, the ring members are formed from a low friction material and are preferably formed from PTFE.

Typically, the elongate tubular member is a micro-tube member and is preferably provided with a connection means at one end thereof, the connection means preferably being adapted to permit connection of said end to a head member. Typically, said end is arranged to be a lower most in-use end.

Preferably, the one or more optical fiber(s) are placed within the micro-tube member prior to deployment downhole, such that, when deployment downhole is required, the micro-tube member and the one or more optical fiber(s) located within the throughbore of the micro-tube member are deployed downhole together.

Preferably, the one or more optical fiber(s) are suspended within the throughbore of the micro-tube member by a protective means which may comprise a fluid and more preferably may comprise a scavenging suspension fluid such as a scavenging gel, which is preferably adapted to prevent ingress of one or more unwanted solids, liquids or gases into the throughbore of the micro-tube member.

Typically, the connection means provided on the head member may comprises a sealing means which may be a chamber area filled with a sealing means such as a hardening sealing means, which is adapted to seal the connection means of the head member with respect to the connection means of the micro-tube member. Preferably, the hardening sealing means may comprise a resin material.

Preferably, the micro-tube and one or more optical fiber(s) may be removed from the external tubular member, if required, for repair/replacement.

Typically, a further sealing means may be provided to seal an outer surface of the micro-tube member from the internal surface of the external tubular member, and said further sealing means may comprise a resin material which is pumped downhole in liquid or low viscosity form and which is adapted to cure or harden after a passage of time and/or under application of heat.

BRIEF DESCRIPTION OF THE DRAWINGS

Embodiments of the present invention will now be described, by way of example only, with reference to the accompanying drawings, in which:
 a.

DETAILED DESCRIPTION OF THE DRAWINGS

Figure 1:
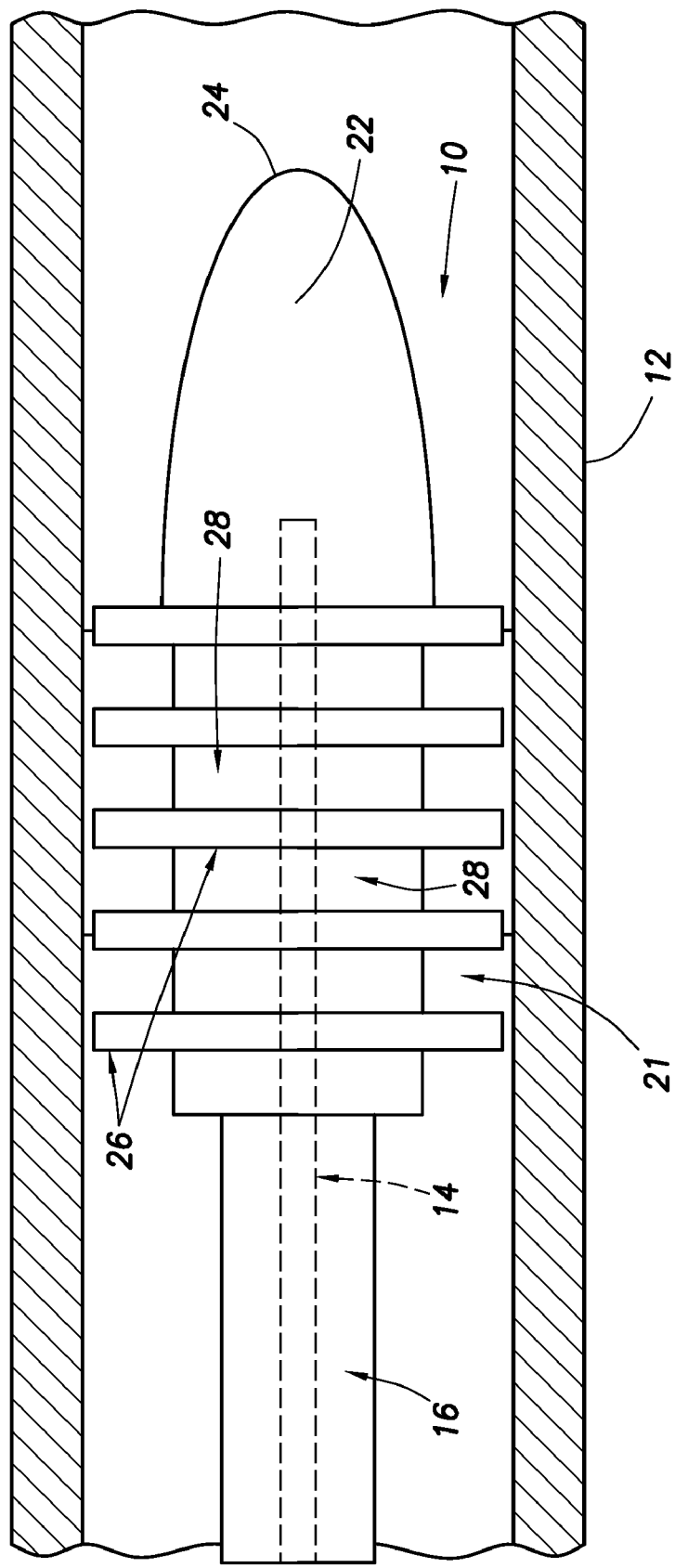
FIG. 1 shows a part cross-sectional side view of a Pumped Fiber Package Deployment apparatus, and more particularly shows an optical fiber and protective micro-tube travelling through a pre-deployed external tube located downhole in an oil, gas or water re-injection well;
 b.

FIG. 1 provides an overview of an embodiment of a Pumped Fiber Package Deployment apparatus 10, or internal package 10, in accordance with the present invention.

As can be seen from FIG. 1, an external tube 12 or external package 12, which may be in the region of ¼ inch outer diameter, has already been installed in the oil, gas or water-injector well. The external tube 12 may be installed in the well by coupling it to a production tubing (not shown) or other in-well tubing string (not shown) at the surface, and then running the in-well tubing into the well.

Figure 2:
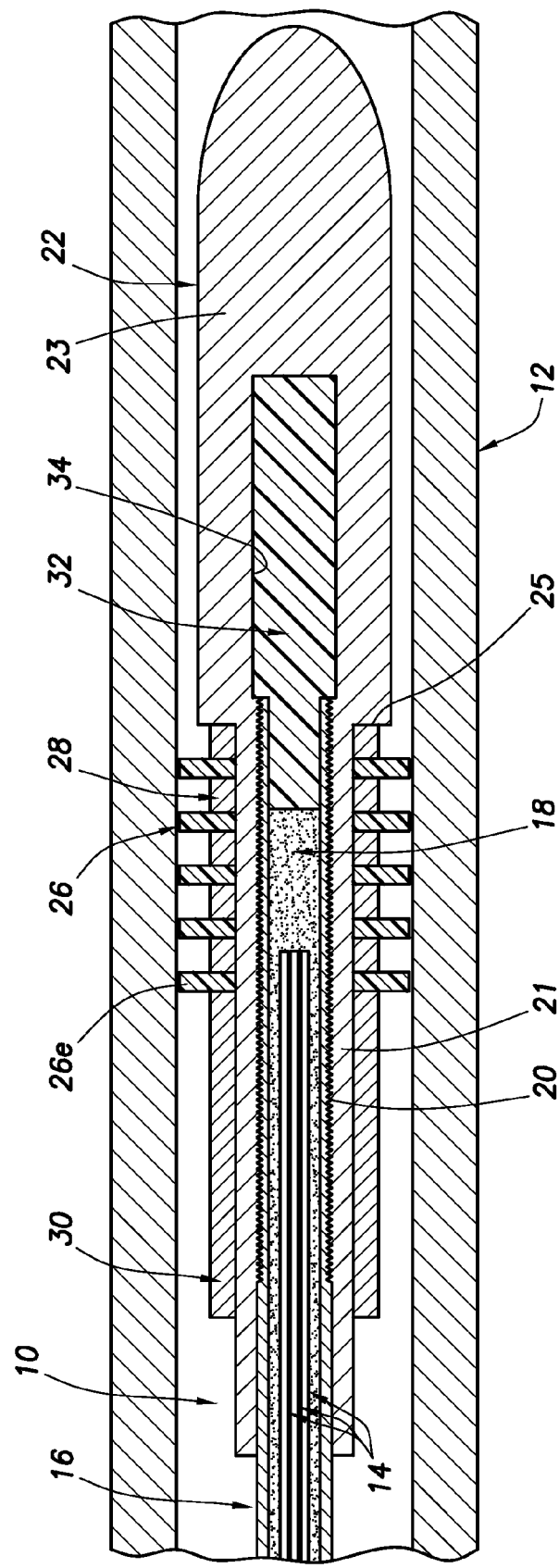
FIG. 2 is a more detailed cross-sectional view of the Pumped Fiber Package Deployment apparatus of FIG. 1; and
 c.

One or more optical fibers 14 to be installed in the well are also shown in FIG. 1; indeed, three optical fibers 14 are shown in FIG. 2. The optical fibers 14 are securely located within a micro-tube 16 which is arranged to provide protection for the optical fibers 14, particularly from axial strain or chemical attack. Furthermore, the optical fibers 14 are fixed within the throughbore of the micro-tube 16 by scavenger gel 18 (as shown in FIG. 2), Typically, the downhole conduit comprises a substantially cylindrical tube, and the head member typically comprises a substantially cylindrical body. Preferably, the head member comprises a drift head member having a tapered nose member and a drift neck portion, and the piston member is preferably mounted upon the head member and more preferably is mounted upon the drift neck portion. Typically, the piston member comprises one or more ring members; where more than one ring members are provided, they are preferably spaced apart along a longitudinal axis of the piston head member. The more than one ring members are preferably spaced apart by spacing members. Preferably, the ring members are formed from a low friction material and are preferably formed from PTFE. which also acts to expel unwanted material such as water, $H_2S$ and $H_2$ and air (i.e. $N_2$, $O_2$, and $CO_2$) from the throughbore of the micro-tube 16. The scavenger gel 18 is commercially available, such as Sepigel H200 LWT.

Indeed, measurements conducted on/using the optical fibers 14, which may include measurements conducted using conventional Fiber Bragg Gratings (FBGs) if these are formed on the outer surface of the optical fibers 14, may well be affected by strain on the optical fibers 14. Accordingly, to minimise any residual strain on the optical fibers 14 as deployed, and for any such strain to be consistent, it is important for the optical fibers 14 to be provided with strain relief. This can be achieved by selecting or adjusting the density of the scavenger gel 18, in which the optical fibers are suspended inside the micro-tube 16, to be as close as possible to that of the optical fiber 14. As background information, an optical fiber 14 conventionally comprises a central glass core, surrounded by a co-axial cladding layer of pure silica, surrounded by a co-axial buffer protective layer such as an acrylic polymer, surrounded by a co-axial strength member layer, surrounded by a co-axial outer jacket.

A Teflon (RTM) (PTFE) coating may be applied to the outer surface of the micro-tube 16 in order to reduce the friction created between the outer diameter of the micro-tube 16 and the inner diameter of the external tube 12.

It is preferred that the optical fiber(s) 14 should be over-stuffed inside the micro-tube 16 to minimise the likelihood of strain being applied to the optical fiber(s) 14 through tensile loads on the micro-tube 16 or through thermal expansion of the micro-tube 16, external tube 12 or production tubing 42. In this regard, it should be noted that the % age elongation before yield of a steel tube is on the order of 6-10%, whereas an optical fiber 14 will elongate only 1-3% or 4% before failure. Accordingly, substantial tensile loads applied to the downhole assemblies may result in optical fiber 14 failure but not impact the tubulars 12; 16; 42. This must be taken into account during the design of a specific installation or deployment.

An additional concern is introduced by the possibility for the micro-tube 16 to be under tension or compression, inside the external tube 12. This uncertainty can be minimised by mounting the micro-tube 16 such that it is fixed to the external tube 12, for example by use of a non-liquid filler material such as epoxy resin. The resin could be pumped in low-viscosity liquid form in the same way as the fluid used to convey the fiber package into the external tube 12, and the resin can be curved with time (at temperature).

The, in use, lower end of the micro-tube 16 is provided with a connection means 20 which, in this example, is in the form of a screw thread connection 20 and is connected to a corresponding screw thread connection formed on a tail portion 21 of a drift body 22. However, it should be noted that other forms of connection means could be used, such as glue or epoxy resin to bond the lower end of the micro-tube 16 to the bore of the tail portion 21.

The drift body 22 also comprises a head portion 23 which is preferably integral with the tail portion 21. As can be seen, particularly from FIG. 2, the tail portion 21 comprises a substantially constant outer diameter along its axial length and the head portion 23 also comprises a constant outer diameter substantially along its axial length, with the exception of its rounded or tapered nose portion 24. However, the constant outer diameter part of the head portion 23 is of a greater outer diameter than that of the neck portion 21. Indeed, as shown in FIG. 2, shoulder portion 25, which extends perpendicularly outwardly from the neck portion 21, provides the transition between the outer diameter of the neck portion 21 and the outer diameter of the head portion 23.

At least one Disk 26 is located on the neck portion 21 of the drift 22. Indeed, as shown in FIG. 2, there are five such located Disks 26, although it will be appreciated by the skilled person that more than five or less than five Disks 26 may be provided. Each Disk 26 is in a form of an annular ring having a central bore through which the neck 21 is passed. The disks 26 are preferably formed from Teflon (RTM) (PTFE) for its low friction properties and relative flexibility, although it should be noted that other suitable materials having these properties could be utilised instead.

The Teflon Disks 26 are spaced apart from one another by a number of spacers 28, which may be suitable formed from brass, and which are in the form of annular rings with a central bore through which the neck portion 21 is threaded. The brass spacers 28 have a smaller outer diameter than that of the Teflon Disks 26, and are adapted to provide a clearance or spacing between each Teflon Disk 26 along the longitudinal axis of the neck portion 21. A brass sleeve 30 is positioned on the neck portion 21 behind the rear most face of the last Teflon Disk 26E and as will be understood subsequently, the brass sleeve 30 is forced in use downwardly (left to right in FIG. 2) by the pressure of fluid behind it/above it in order to maintain the Teflon Disks 26 in the arrangement shown in FIG. 2.

Resin material 32 is provided within a cavity 34 formed within the head portion 23 of the drift 22 and acts to ensure that no undesirable fluids such as water or gases can enter the interior of the micro tube 16, since the resin material 32 seals the lower most end of the internal bore of the micro-tube 16 and the internal cavity 34 of the head portion 23.

Figure 3:
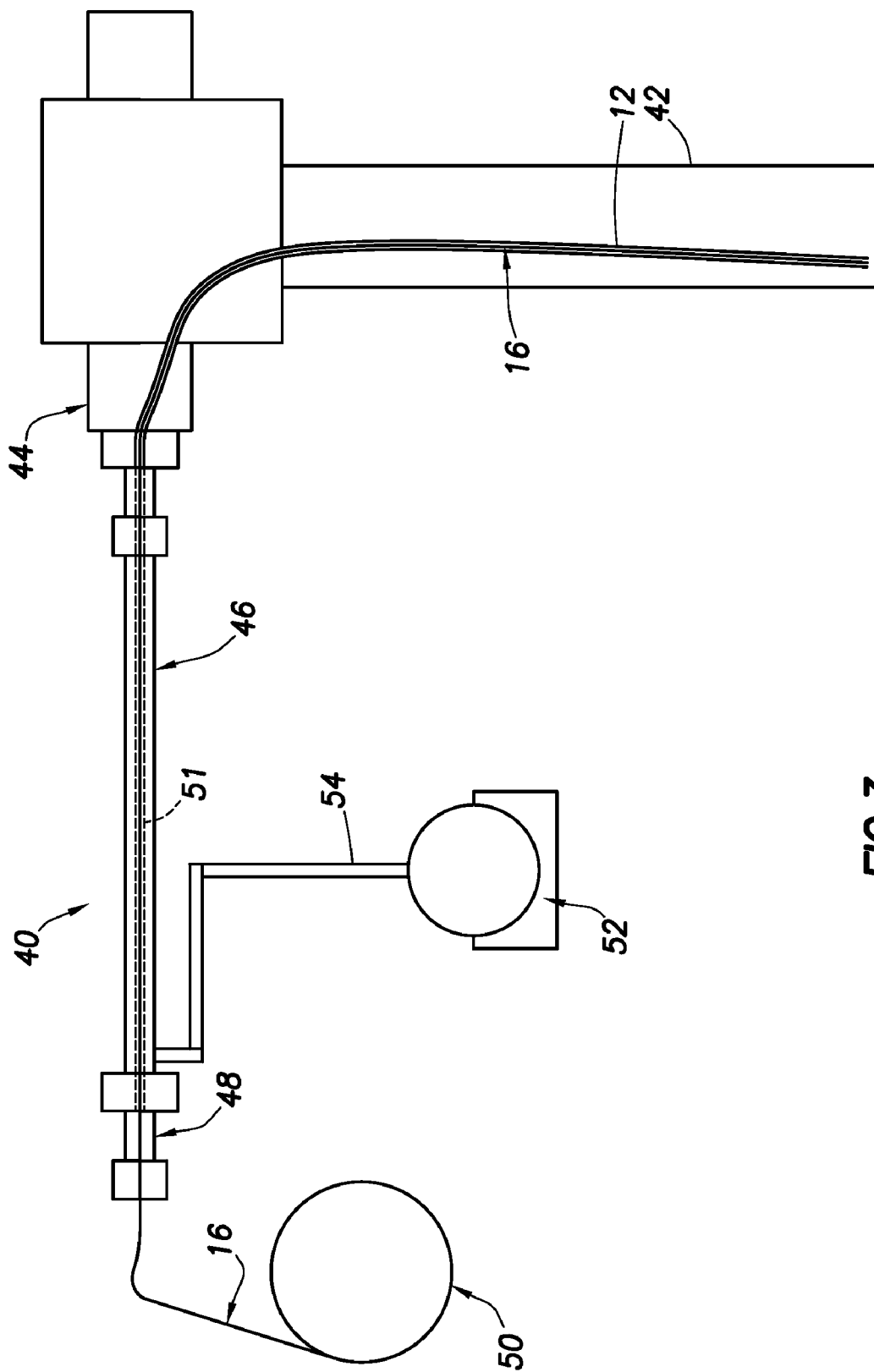
FIG. 3 is a schematic view of a surface pumping arrangement for use with the Pumped Fiber Package Deployment apparatus of FIG. 1.

Installation of the micro tube 16 (and thus the optical fibers 14) will now be described. Referring to FIG. 3, a pumping-in arrangement 40 is shown. As has been previously described the external tube 12 has already been installed in the borehole by, for instance, being attached to the production tubing 42 or other in-well tubing string. The upper end of the external tube 12 is arranged to pass up through a well head 44, which is conventionally located at the mouth of the borehole. Indeed, the upper end of the external tube 12 is connected to a reduced-diameter lead-in section 46 which comprises a bore having substantially the same inner diameter as that of the external tube 12. Indeed, the inner most end (right hand end) of the bore of the lead-in section 46 is in sealed fluid communication with the bore of the external tube 12. As can be seen in FIG. 3, the lead-in section 46 extends outwardly and laterally from the wellhead 44. A stuffing box 48 is located at the outer end (left hand end) of the lead-in section 46, and the micro tube 16 is fed through the stuffing box 48 from a fiber reel 50. Indeed, the stuffing box 48 is arranged to provide a seal about the outer diameter of the micro tube 16 such that the annulus 51 defined between the inner surface of the bore of the lead-in section 46 and the outer surface of the micro tube 16 is sealed with respect to the outer environment. Accordingly, in this manner, pressure is retained within the pumping in arrangement 40. The stuffing box 48 may be similar to a conventional stuffing box used for wireline operations in the oil and gas industry.

A hydraulic injection pump 52 is connected to the interior of the bore of the lead-in section 46 via a pipe 54 and is used to pump hydraulic fluid at pressure into the annulus 51 of the bore of the lead-in section 46.

In order to deploy and locate the micro tube 16 and thus the obstacle fibers 14 downhole within the pre-installed external tube 12, the drift is first inserted into the annulus 51 through the stuffing box 48 until the drift body 22 passes the point at which the pipe 54 communicates with the annulus 51. Hydraulic fluid can then be pumped into the annulus 51 by actuation of the hydraulic injection pump 52. The pressure built up by the hydraulic fluid will act upon the disks 26 which will act in a similar manner to the way in which a piston acts in a cylinder in that the pressure acting upon the disks will force them and hence the drift body 22 and thus the micro-tube 16 to move along through the lead-in section 46 (from left to right as shown in FIG. 3) and down into the bore of the external tube 12.

A PTFE coating may be applied to the outer surface of the micro-tube 16 in order to reduce the friction created between the outer diameter of the micro-tube 16 and the inner diameter of the external tube 12.

As stated above, the outer diameter of the external tube is 0.25 inches and the wall thickness of such external tubes 12 are normally either 0.035 inch or 0.028 inch. Ideally, the Teflon Disks 26 would be chosen to have an outer diameter of either 0.215 inch or 0.222 inches respectively and have a thickness of approximately 0.04 inch, such that their outer diameter would be flush with the inner diameter of the external tube 12 to within a tolerance of between 0.005 inch and 0.010 inch. However, in reality there is likely to be a small gap left between the Teflon Disk 26 outer diameter and the external tube 12 inner diameter, the size of which will depend on factors such as fluid viscosity and annulus pressure—it is believed that a preferred gap between the outer diameter of the Teflon Disks 26 and the inner diameter of the external tube 12 should be in the range of 0.010 inch to 0.020 inch. Furthermore, it is likely that the PTFE discs 26 will wear during the pumping operation, i.e. the clearance at the end of the pump-in operation will be greater than at the start of the operation. This is not necessarily a disadvantage, as the more fiber package 10 that is deployed into the well, the greater the friction drag forces will be along the fiber package 10, thus helping pump the package 10 into position.

It should be noted that the pumping pressure will exceed the annulus pressure of the wellbore itself by approximately 3000 psi or greater, in order to ensure that the micro-tube 16 will reach the required depth of installation. Furthermore, although hydraulic fluid such as silicone oil is preferred to be pumped into the annulus 51 by the hydraulic injection pump 52, the following fluids could also be used in order of decreasing preference:

a. annulus fluid; water; other fluids such as treatment chemicals.

The, in use, lower end of the micro-tube 16 is provided with a connection means 20 which, in this example, is in the form of a screw thread connection 20 and is connected to a corresponding screw thread connection formed on a neck portion 21 of a drift body 22. However, it should be noted that other forms of connection means could be used, such as glue or epoxy resin to bond the lower end of the micro-tube 16 to the bore of the neck portion 21.

The drift body 22 also comprises a head portion 23 which is preferably integral with the neck portion 21. As can be seen, particularly from FIG. 2, the neck portion 21 comprises a substantially constant outer diameter along its axial length and the head portion 23 also comprises a constant outer diameter substantially along its axial length, with the exception of its rounded or tapered nose portion 24. However, the constant outer diameter part of the head portion 23 is of a greater outer diameter than that of the neck portion 21. Indeed, as shown in FIG. 2, shoulder portion 25, which extends perpendicularly outwardly from the neck portion 21, provides the transition between the outer diameter of the neck portion 21 and the outer diameter of the head portion 23.

At least one Disk 26 is located on the neck portion 21 of the drift 22. Indeed, as shown in FIG. 2, there are five such located Disks 26, although it will be appreciated by the skilled person that more than five or less than five Disks 26 may be provided. Each Disk 26 is in a form of an annular ring having a central bore through which the neck 21 is passed. The disks 26 are preferably formed from PTFE for its low friction properties and relative flexibility, although it should be noted that other suitable materials having these properties could be utilised instead.

The PTFE Disks 26 are spaced apart from one another by a number of spacers 28, which may be suitable formed from brass, and which are in the form of annular rings with a central bore through which the neck portion 21 is threaded. The brass spacers 28 have a smaller outer diameter than that of the PTFE Disks 26, and are adapted to provide a clearance or spacing between each PTFE Disk 26 along the longitudinal axis of the neck portion 21. A brass sleeve 30 is positioned on the neck portion 21 behind the rear most face of the last PTFE Disk 26E and as will be understood subsequently, the brass sleeve 30 is forced in use downwardly (left to right in FIG. 2) by the pressure of fluid behind it/above it in order to maintain the PTFE Disks 26 in the arrangement shown in FIG. 2.

Higher tensile forces may be achieved through the use of multiple drift bodies 22 in a series (not shown). However, at each tubing coupling, a cable protector, if used, will cause a kink in the external tube 12. Accordingly, if multiple drift bodies are used, these should be connected together by a flexible rod arrangement (not shown) rather than a rigid rod, which may not be able to pass through the kinked section.

It should be noted that it is expected that some fluid will always bypass the drift 22. This additional fluid provides an additional and complementary transport mechanism for the fiber package 10. In other words, the fiber package 10 is both pulled through the external tube 12 by the forces acting on the drift body 22 and carried through the tube 12 by the friction forces caused by the fluid flowing past the fiber package 10 (and hence also past the drift body 22).

The cumulative friction along the length of an installed micro-tube 16 may be considerable, and the effectiveness of the drift body 22 may need to be reduced to allow a greater amount of fluid to pass, carrying the micro-tube 16 with it, thus reducing the absolute tensile load at the end of the deployed fiber package.

The pumping in arrangement can be modified and/or improved by the use of a longer lead-in tube section 46 of reduced diameter, such that only a small clearance is left between the inner diameter of the lead-in tube 46 and the outer diameter of the micro-tube 16. In any event, the lead-in tube section 46 operates by creating a high flow rate past the micro-tube 16 inside, thus pushing it into the ¼" external tube 12. The combination of push from the lead-in tube 46 and pull from the drift body 22 provides a reliable pump-in method since the fiber package 10 is both pulled by the drift 22 and carried by the fluid passing the drift body 22.

The external tube need not of course be ¼" in outer diameter; other sizes will work equally well. One quarter inch is quoted as this dimension is currently and widely used for downhole applications.

As stated above, the outer diameter of the external tube is 0.25 inches and the wall thickness of such external tubes 12 are normally either 0.035 inch or 0.028 inch. Ideally, the PTFE Disks 26 would be chosen to have an outer diameter of either 0.215 inch or 0.222 inches respectively and have a thickness of approximately 0.04 inch, such that their outer diameter would be flush with the inner diameter of the external tube 12 to within a tolerance of between 0.005 inch and 0.010 inch. However, in reality there is likely to be a small gap left between the PTFE Disk 26 outer diameter and the external tube 12 inner diameter, the size of which will depend on factors such as fluid viscosity and annulus pressure—it is believed that a preferred gap between the outer diameter of the PTFE Disks 26 and the inner diameter of the external tube 12 should be in the range of 0.010 inch to 0.020 inch. Furthermore, it is likely that the PTFE discs 26 will wear during the pumping operation, i.e. the clearance at the end of the pump—in operation will be greater than at the start of the operation. This is not necessarily a disadvantage, as the more fiber package 10 that is deployed into the well, the greater the friction drag forces will be along the fiber package 10, thus helping pump the package 10 into position.

Accordingly, the embodiments hereinbefore described provide the advantage that the tensile forces created by the drift body 22 pull the micro-tube 16 (and hence the optical fiber(s) 14) through the external tube 12 and complement the drag forces, which act on the external surface of the micro-tube 16, caused by the pumped fluid or gas. This is mainly achieved by the arrangement of the drift body 22 which enables hydraulic pressure to exert maximum tensile force on the drift body 22 (and hence the micro-tube 16 and optical fiber 14) whilst still enabling the drift body 22 to pass debris (not shown) or a protuberance (not shown) on the inner surface of the external tube.

An advantage of the embodiments hereinbefore described is that the robustness of the fiber package 14; 16 and reliability of the pumping-in arrangement 40 enable the fiber package 14; 16 to be pumped in tubes (not shown) other than those installed for this express purpose. Such alternative tubes could be downhole valve control lines or chemical injection lines.

Further modifications and improvements may be made to the embodiments hereinbefore described without departing from the scope of the invention.

The embodiments hereinbefore described address these issues by using a PTFE disc 26 to fill the available cross-section area with a minimum of clearance. Should an obstruction be encountered, the PTFE disc 26 is sufficiently flexible to deform and pass the obstruction. This flexibility can be adjusted by using different thicknesses of PTFE disc 26.

By stacking multiple PTFE discs 26 as hereinbefore described, the advantage is provided that the amount of pump—in fluid bypassing the drift body 22 is reduced. It is preferable to space the discs 26 a distance apart to retain the flexibility necessary to pass the drift body 22 over an obstruction, and the brass spacers 28 are used between stacked discs 26 to achieve this spacing.

The use of the material PTFE for the discs 26 keeps the friction caused by the drift body 22—which could be significant if multiple discs are used—to a minimum.

The invention claimed is:

1. A method of deploying one or more optical fiber(s) downhole, the method comprising the steps of:
    locating said one or more optical fiber(s) within a throughbore of an elongate tubular member, the elongate tubular member being a micro-tube member and being provided with a connection means at a lower in-use end thereof, the connection means being adapted to permit connection of said end to a head member, and a connection means of the head member comprising a chamber area filled with a sealing means adapted to seal the connection means of the head member with respect to the connection means of the micro-tube member; and
    deploying said elongate tubular member downhole.

2. A method according to claim 1, wherein said elongate tubular member is deployed downhole within an external tubular member already located downhole.

3. A method according to claim 1, wherein said elongate tubular member is deployed downhole within the external tubular member already located downhole by being pumped through the throughbore of the external tubular member already located downhole.

4. A method according to claim 1, wherein the one or more optical fiber(s) are placed within the micro-tube member prior to deployment downhole, such that, when deployment downhole is required, the micro-tube member and the one or more optical fiber(s) located within the throughbore of the micro-tube member are deployed downhole together.

5. A method according to claim 1, wherein the one or more optical fiber(s) are suspended within the throughbore of the micro-tube member by a protective means adapted to prevent ingress of one or more unwanted solids, liquids or gases into the throughbore of the micro-tube member.

6. A method according to claim 1, wherein a further sealing means is provided to seal an outer surface of the micro-tube member from an internal surface of the external tubular member.

7. A method according to claim 6, wherein said further sealing means comprises a resin material which is pumped downhole in low viscosity form and which is adapted to cure or harden after a passage of time and/or under application of heat.

8. A method of deploying at least one optical fiber downhole, the method comprising the steps of:
    providing the optical fiber within a tubular elongate member;
    extending a tube along a length of a tubing;
    installing the tubing with the tube into a wellbore;
    then coupling the tube to a wellhead at a surface of the wellbore;
    positioning the elongate member within a tubular lead-in section coupled to the wellhead;
    providing fluid communication between the lead-in section and the tube;
    then pumping fluid into the lead-in section and through the tube, the fluid flowing from the lead-in section to the tube, thereby drawing the elongate member into the tube ; and
    wherein the fluid is a hardenable fluid, and further comprising the step of permitting the fluid to harden in the tube about the elongate member.

9. The method of claim 8, wherein the fluid hardens due to passage of time.

10. The method of claim 8, wherein the fluid hardens due to application of heat.

11. The method of claim 8, wherein the pumping step further comprises flowing the fluid through an inner diameter portion of the lead-in section having a reduced diameter relative to the tube.

12. The method of claim 11, wherein the fluid flowing about the elongate member in the reduced inner diameter portion of the lead-in section pushes the elongate member into the tube.

13. A method of deploying at least one optical fiber downhole, the method comprising the steps of:
    providing the optical fiber within a tubular elongate member;
    extending a tube along a length of a tubing;
    installing the tubing with the tube into a wellbore;
    positioning the elongate member within a tubular lead-in section, an inner diameter portion of the lead-in section having a reduced diameter relative to the tube;
    providing fluid communication between the lead-in section and the tube;
    pumping fluid into the lead-in section and through the tube, the fluid flowing from the lead-in section to the tube, thereby drawing the elongate member into the tube, and the fluid flowing about the elongate member in the reduced inner diameter portion of the lead-in section pushing the elongate member into the tube ; and wherein the fluid is a hardenable fluid, and further comprising the step of permitting the fluid to harden in the tube about the elongate member.

14. The method of claim 13, further comprising the step of coupling the tube to a wellhead at a surface of the wellbore.

15. The method of claim 13, further comprising the step of coupling the lead-in section to a wellhead at a surface of the wellbore.

16. The method of claim 13, wherein the fluid hardens due to passage of time.

17. The method of claim 13, wherein the fluid hardens due to application of heat.

* * * * *